(12) United States Patent
Oren et al.

(10) Patent No.: US 8,606,246 B2
(45) Date of Patent: Dec. 10, 2013

(54) SYSTEMS AND METHODS FOR PROVIDING TELEPHONY SERVICES

(75) Inventors: Amichay Oren, Rosh-a-ayin (IL); Gregory Hardy, Marietta, GA (US); Moti Gust, Haniel (IL)

(73) Assignee: Vonage Network, LLC, Holmdel, NJ (US)

( * ) Notice: Subject to any disclaimer, the term of this patent is extended or adjusted under 35 U.S.C. 154(b) by 0 days.

(21) Appl. No.: 13/612,339

(22) Filed: Sep. 12, 2012

(65) Prior Publication Data

US 2013/0003612 A1 Jan. 3, 2013

Related U.S. Application Data

(63) Continuation of application No. 13/102,217, filed on May 6, 2011, now abandoned.

(60) Provisional application No. 61/473,911, filed on Apr. 11, 2011.

(51) Int. Cl.
*H04M 3/42* (2006.01)

(52) U.S. Cl.
USPC ........................................ 455/414.1

(58) Field of Classification Search
USPC ........................................ 455/414.1
See application file for complete search history.

(56) References Cited

U.S. PATENT DOCUMENTS

| | | | |
|---|---|---|---|
| 5,949,880 A | 9/1999 | Curry et al. | |
| 6,105,013 A | 8/2000 | Curry et al. | |
| 6,628,934 B2 * | 9/2003 | Rosenberg et al. | 455/411 |
| 7,035,625 B2 | 4/2006 | Tijerino | |
| 8,024,230 B2 * | 9/2011 | Zeinfeld et al. | 705/26.1 |
| 8,107,953 B2 * | 1/2012 | Zimmerman et al. | 455/433 |
| 8,364,146 B1 * | 1/2013 | Peng et al. | 455/435.1 |
| 2002/0115447 A1 | 8/2002 | Martin et al. | |
| 2003/0003933 A1 | 1/2003 | Deshpande et al. | |
| 2003/0013434 A1 | 1/2003 | Rosenberg et al. | |
| 2003/0069918 A1 | 4/2003 | Lu et al. | |
| 2003/0203731 A1 | 10/2003 | King et al. | |
| 2004/0043753 A1 | 3/2004 | Wake et al. | |
| 2005/0079863 A1 | 4/2005 | Macaluso | |
| 2006/0009218 A1 | 1/2006 | Moss | |
| 2006/0030315 A1 * | 2/2006 | Smith et al. | 455/432.3 |
| 2006/0287950 A1 | 12/2006 | Steinberg et al. | |
| 2007/0099599 A1 * | 5/2007 | Smith et al. | 455/414.1 |
| 2008/0167036 A1 | 7/2008 | Bush et al. | |
| 2009/0054030 A1 | 2/2009 | Golds | |

(Continued)

OTHER PUBLICATIONS

International Search Report issued in PCT/US2012/031103 on Oct. 23, 2012.

(Continued)

*Primary Examiner* — Nathan Mitchell

(74) *Attorney, Agent, or Firm* — Nixon & Vanderhye P.C.; Joseph Pagnotta

(57) ABSTRACT

A system and method for enabling a user to purchase an instant mobile telephony services plan makes use of an application on a mobile telephony device. The user can purchase an instant mobile plan via a third party merchant. Once purchased, the user can also make use of the application on the user's mobile telephony device to obtain the purchased telephony services. The communications services provider that provides services to the user under an instant mobile plan may be different from the communications services provider that is tied to the user's mobile telephony device.

31 Claims, 7 Drawing Sheets

(56) References Cited

U.S. PATENT DOCUMENTS

| | | |
|---|---|---|
| 2009/0181641 A1 | 7/2009 | Fiatal |
| 2009/0280796 A1 | 11/2009 | Macaluso |
| 2010/0185489 A1 | 7/2010 | Satyavolu et al. |
| 2011/0085653 A1 | 4/2011 | Bailey et al. |
| 2011/0177797 A1 | 7/2011 | Vendrow et al. |

OTHER PUBLICATIONS

Written Opinion issued in PCT/US2012/031103 on Oct. 23, 2012.
Office Action issued in U.S. Appl. No. 13/102,217 on Dec. 8, 2011.
Office Action issued in U.S. Appl. No. 13/244,906 on Dec. 8, 2011.
Final Rejection issued in U.S. Appl. No. 13/244,906 on Jun. 21, 2011.

* cited by examiner

SYSTEMS AND METHODS FOR PROVIDING TELEPHONY SERVICES

This application is a continuation of U.S. application Ser. No. 13/102,217, which was filed May 6, 2011, now abandoned the contents of which are hereby incorporated by reference. This application also claims priority to U.S. Provisional Patent Application No. 61/473,911, which was filed Apr. 11, 2011, the contents of which are also hereby incorporated by reference.

BACKGROUND OF THE TECHNOLOGY

The technology is related to Voice over Internet Protocol (VOIP) telephone systems which connect telephone calls, deliver text messages and provide other telephony services using data packet communications. In particular, the technology is related to systems and methods of providing users with VOIP-based telephony services under rate plans or rate agreements.

A user wishing to obtain telephony services typically establishes an enduring relationship with one telephony services provider. The user typically agrees to purchase telephony services under a monthly service plan, and the service plan dictates how much the user is charged for the telephony services.

One example would be for a user to agree to pay a monthly fee for a service plan that allows the user to make unlimited telephone calls to telephone numbers within a defined geographical region, such as within their own country. Such a plan might also establish a per minute charge for telephone calls to telephone numbers located outside the defined geographical region. A different per minute charge would typically be specified for telephone calls to different geographical regions. With these types of service plans, the user is forced to establish a long term relationship with the telephony services provider. The service provider usually assigns a telephone number to the user, and bills the user on a monthly basis. Also, specific equipment such as a mobile telephony device that is associated with the telephony services provider must be purchased, leased or otherwise acquired in order to access a dedicated service provider network.

More recently, it is possible for a user to purchase a specified amount of telephony services from a telephony services provider without entering into a long term or enduring relationship with the service provider. For example, it is possible for a user to purchase a specified number of calling minutes which can be used to place telephone calls to telephone numbers within a particular geographical area. Under this type of service plan, each time the user places a telephone call, the total number of minutes used during the call are deducted from the total number of minutes initially purchased by the user. Once the total number of minutes has been used, the user can no longer place telephone calls.

In most instances, when a user purchases only a specified number of minutes from a telephony services provider, simply dialing the telephone number of the party the user wishes to reach is not possible. Instead, the user must first dial an access number, and then input an identification number. This allows the telephony services provider to verify that the user has already paid for a valid service plan, and that the plan still includes unused calling minutes. Once the telephony service provider has verified these items, the user is allowed to dial a telephone number in order to place a telephone call.

These types of telephony service plans are inconvenient for two reasons. First, the user must accomplish a financial transaction with the telephony services provider, or with a third party merchant, in order to purchase the defined number of calling minutes. And the purchase process cannot normally be accomplished quickly and easily via the user's telephony device. Instead, the purchase is done in person at a third party merchant, or online using a web browser which allows the user to interact with an online merchant in order to purchase the rate plan.

Second, once the user has purchased a telephony services plan, the user is forced to dial an access number and provide identifying information before the user is allowed to place a telephone call under the services plan. This process is time consuming and inconvenient.

More recently, some telephony services providers have developed applications which can be downloaded and installed onto a user's mobile telephony device. The application provides an interface that facilitates the user's usage of purchased service plans. Once the user has purchased a service plan from the telephony services provider, the application can be used to easily dial a telephone number to place a telephone call under the rate plan. Thus, the application may eliminate the need to first dial an access number, and to provide identifying information, before it is possible to actually place a telephone call.

However, even when a telephony service provider's application is loaded onto a user's mobile telephony device, the user is still forced to conduct a separate financial transaction with the telephony services provider in order to purchase a service plan. That financial transaction normally requires the use of an Internet browser which interacts with the telephony service provider so that the user can purchase a service plan using a credit card.

Existing telephony service providers are not able to provide a user with an easy, convenient and quick way to purchase a rate plan via their mobile telephony device, where the user can thereafter immediately begin using the purchased telephony services via their mobile telephony device.

DETAILED DESCRIPTION OF PREFERRED EMBODIMENTS

Figure 1:
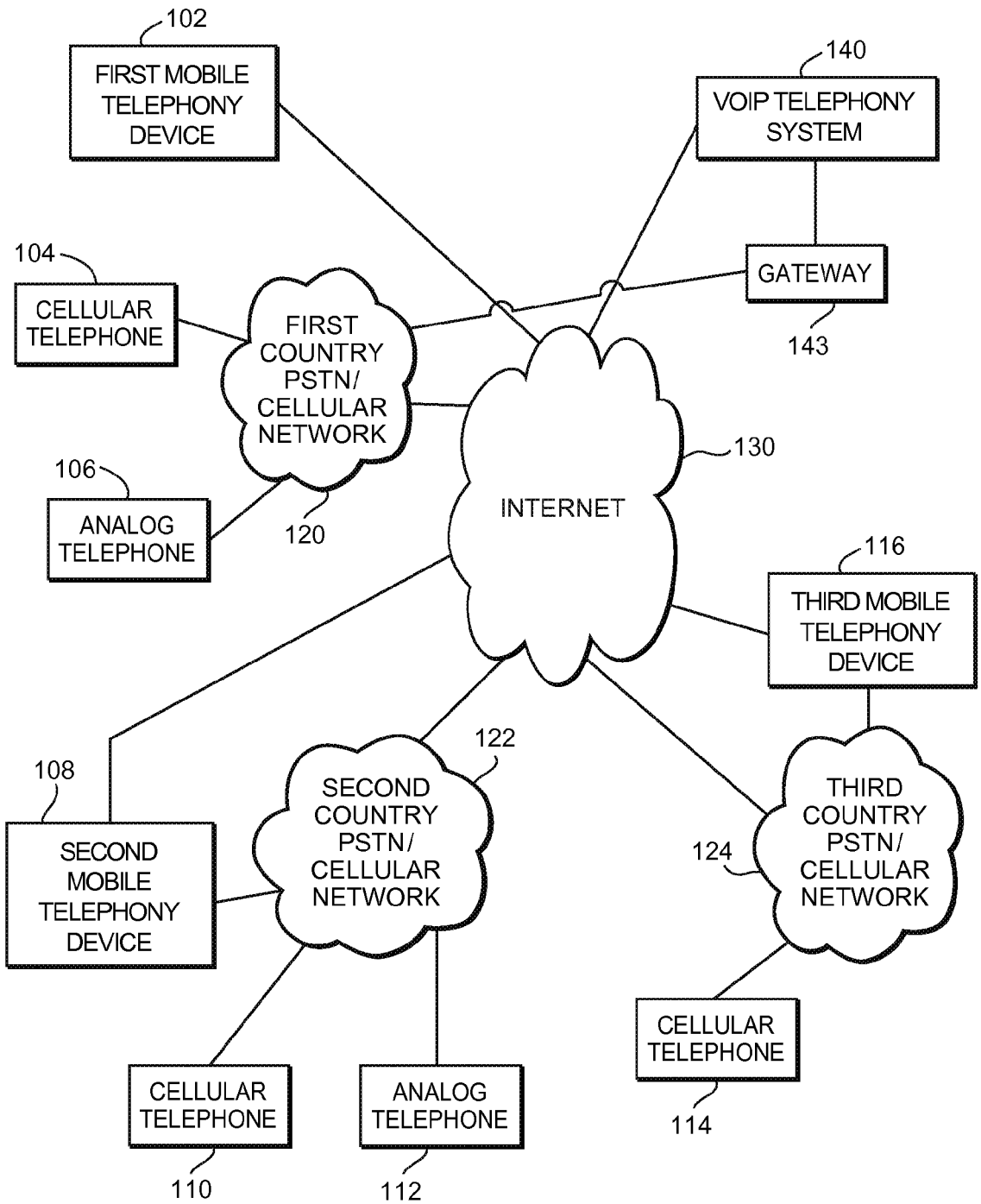
FIG. 1 is a diagram of various elements associated with a VOIP telephony system and typical PSTNs.

Elements typically involved in providing a user with VOIP-based telephony services are illustrated in FIG. 1. As shown therein, a VOIP telephony system 140 is connected to the Internet 130. The VOIP telephony system 140 may also be connected to one or more public switched telephone networks (PSTNs) and/or cellular networks via a gateway 143. In the following description, a PSTN and a cellular network will be considered part of the same overall system.

The VOIP telephony service 140 receives requests for telephony services via the Internet 130 or via the PSTN/cellular networks 120, 122, 124. In response to a request to set up a telephone call to a destination telephone number, the VOIP telephony system 140 establishes a telephone call between the requesting telephony device and the called telephony device through the Internet 130. In some instances, the call may also traverse one or more PSTN/cellular networks.

For example, a user's first mobile telephony device 102 could be used to send a call setup request to the VOIP telephony system 140 via data traversing the Internet 130. Specifically, a user could request that a telephone call be connected between the first mobile telephony device 102 and the analog telephone 106. In response to the request, the VOIP telephony system 140 sets up a telephone call to the analog telephone 106 via the gateway 143 and the first PSTN/cellular network 120.

FIG. 1 also illustrates that telephone calls can be connected through the VOIP telephony system 140 to telephony devices located in other countries. For example, the VOIP telephony system 140 could set up a telephone call between the first mobile telephony device 102 and analog telephone 112 located in a second country. This would be accomplished by routing the telephone call through the Internet 130, and then through the PSTN/cellular network 122 located in the second country.

In addition, a user of the VOIP telephony system 140 could be located in the second country. For example, a customer of the VOIP service could utilize the second mobile telephony device 108 located in the second country to request that a call be established between the second mobile telephony device 108 and cellular telephone 104. The second mobile telephony device 108 would communicate with the VOIP system 140 via the Internet. And the VOIP service would establish the call using the PSTN/cellular network 120 and the gateway 143.

As illustrated in FIG. 1, a cellular telephone 110 and an analog telephone are connected to the second country's PSTN/cellular network 122. These devices could be placed in contact with users of the VOIP telephony service via VOIP telephone calls that traverse the Internet 130 and the second country's PSTN/cellular network 122.

As also illustrated in FIG. 1, a cellular telephone 114 and a third mobile telephony device 116 located in a third country could also obtain telephony services from the VOIP telephony system 140 through the Internet 130 and via a PSTN/cellular network 124 located in the third country.

As explained above, the location of the VOIP telephony service is relatively unimportant. So long as the customer has an Internet connection, or a data connection via a data channel of a cellular network, customers can access the VOIP telephony system 140 via the Internet.

The subject invention provides a new way of allowing users to purchase and use a telephony services plan. The new systems and methods make it easy to purchase a telephony service plan using a telephony device. Once the service plan has been purchased, the user can immediately begin utilizing the service plan to obtain telephony services. The disclosed systems and methods make it fast, easy and convenient to purchase and use telephony services with a single telephony device. Moreover, the purchased service plan is not necessarily associated with the native service provider of the mobile telephony device.

In the following description, references will be made to a "mobile computing device" and to a "mobile telephony device." These terms are used to refer to mobile devices which are capable of downloading, installing and running applications. Such devices are also capable of interacting with a VOIP telephony service, via a digital data link, to obtain telephony services. Examples of such devices include the iPhone™, the iTouch™, the iPad™, all of which are manufactured and sold by Apple, Inc. of Cupertino, Calif., as well as other similar mobile telephones and mobile computing devices.

Also, in the following description, a distinction will be made between users who interact with a VOIP telephony system under a traditional services plan, and users who interact with the VOIP telephony system to purchase a service plan that includes a pre-defined bundle of telephony services. For purposes of the following description, service plans that provide only a pre-defined bundle of telephony services will be referred to as an "instant mobile telephony service plan." However, this description of the service plan should in no way be considered limiting.

In some instances, an instant mobile plan could allow a user to obtain an unlimited amount of telephony services that are terminated in a particular geographical area for a predetermined period of time. For instance, a plan could allow a user to make one or more number of telephone calls or allow the user to send one or more instant messages, text messages or SMS messages to telephone numbers located within a particular geographical area for a predetermined period of time. The time period could be one day, one week, one month, or some other period of time.

The telephony service provided under an instant mobile plan could also enable a user to send one or more videos to a telephony device associated with a particular destination telephone number. The amount of video sent under a plan could be unlimited for a predetermined period of time. Alternatively, the user could be limited to sending a predetermined number of video clips having a predetermined maximum data file size. In still other instances, the plan may limit the user to sending a predetermined total number of gigabytes of video data.

An instant mobile plan could be limited to only placing one or more telephone calls, or the plan could be limited to only sending text messages, or the plan could include both placing telephone calls and sending text messages. The ability to send videos may be included in a plan, or the ability to send video files could be a plan option that the user pays extra to obtain.

An instant mobile plan could also allow a user to obtain a predetermined number of minutes of calling time for calls directed to telephone numbers within a particular geographical area. Similarly, a plan could allow a user to send a predetermined number of text messages to telephone numbers within a predetermined geographical area. In other instances, an instant mobile plan could allow a user to obtain a predetermined number of minutes of calling time, and send a predetermined number of text messages to telephone numbers within a predetermined geographical area. These types of plans might also be time limited in some fashion. For example, an instant mobile plan could allow a user to obtain a predetermined number of minutes of calling time, so long as the calls are made within a predetermined period of time such as one month, or one year.

Because the cost of terminating calls and sending text messages varies depending on the location where the calls/messages are sent, instant mobile plans would typically be priced differently depending on the location where the calls will terminate. In other instances, however, a particular instant mobile plan might allow a user to place an unlimited number of calls or obtain a predetermined number of minutes of calling time to numbers in any geographical location whatsoever, with a corresponding price being attached to that plan.

As noted above, under a traditional calling plan, the user is assigned a telephone number, and the user is often identified by that telephone number. When a user purchases an instant mobile telephony services plan, the user will not typically be assigned a telephone number. Instead, the plan will be associated with a particular identifier. The identifier could be a username selected by the user. The identifier or the username may be assigned by the VOIP telephony system itself when the instant mobile plan is purchased. The identifier could be things other than a username, such as an email address. Virtually any type of identifier capable of uniquely identifying the party purchasing the plan could be used.

Figure 3:
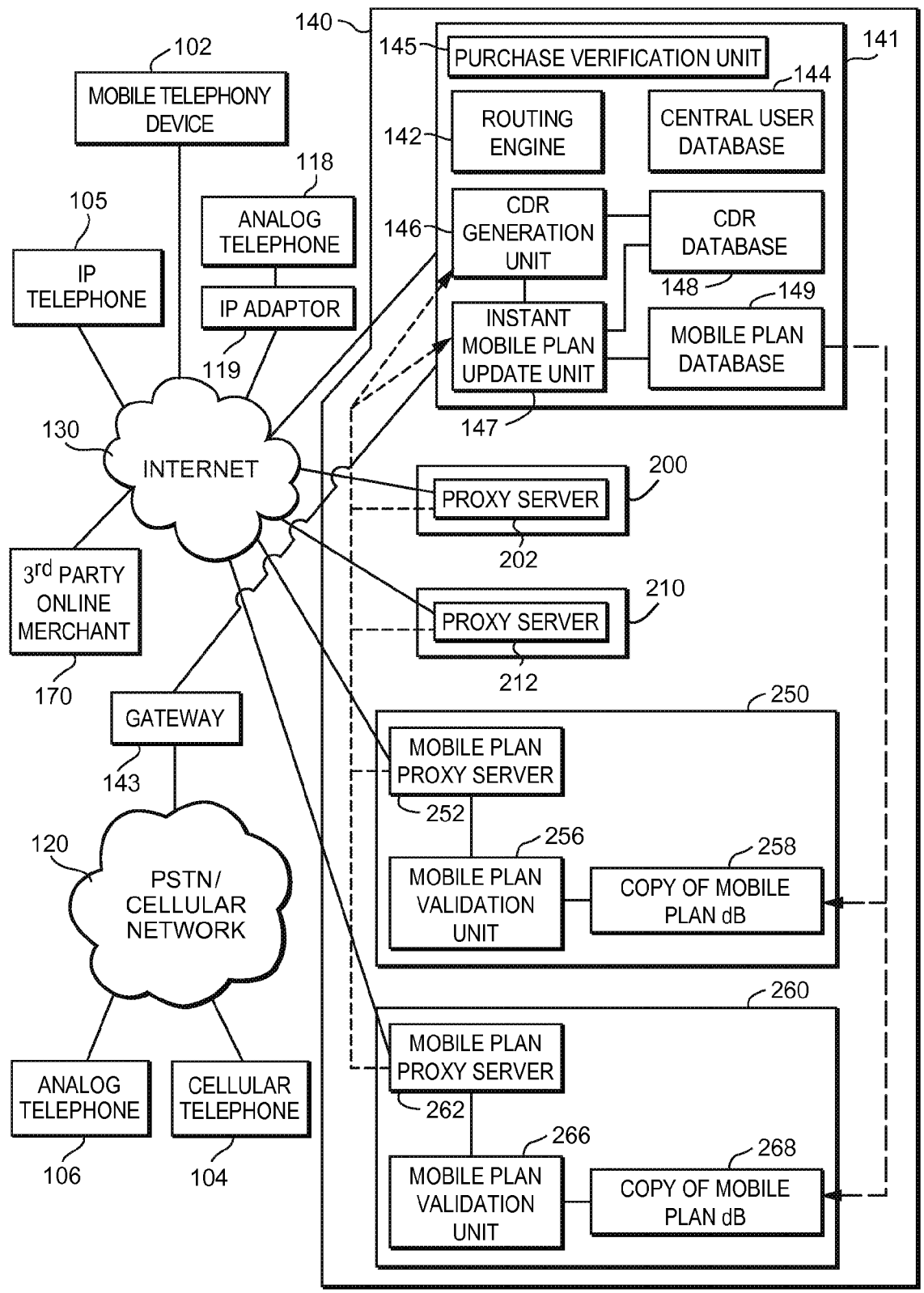
FIG. 3 is a diagram of various elements that allow users to purchase telephony services from a VOIP telephony service provider, and that allow the VOIP telephony system to provide the purchased telephony services to the users.

FIG. 3 illustrates elements of a VOIP system 140 which can be used to provide telephony services to users. As shown in FIG. 3, the VOIP telephony system 140 includes a VOIP telephony system control center 141 with a routing engine 142, a central user database 144, a call detail record (CDR) generation unit, and a CDR database 148. The control center 141 also includes a purchase verification unit 145, an instant mobile plan database 149, and an instant mobile plan update unit 147.

The routing engine 142 provides information which allows telephone calls to be routed to a destination telephony device associated with a dialed telephone number. As is well known to those of ordinary skill in the art, a routing engine will typically provide a list of destination gateways which can be used to complete a call to a dialed telephone number.

The central user database includes various items of information about individual users. The central user database can indicate whether or not a user is currently authorized to make certain types of telephone calls or obtain other forms of telephony services. A central user database can also include various items of information which help to prevent fraud.

The central VOIP telephony system tracks information about each of the calls which are completed for its users. Typically, each time a user makes a telephone call, at the completion of the telephone call, various items of information about the call are stored by the system. The information recorded for a particular call is referred to as a Call Detail Record (CDR). The CDR generation unit 146 actually generates the CDR, and the CDR is recorded in the CDR database 148.

The VOIP telephony system 140 includes multiple different call processing units 200, 210, 250, 260. Typically, the call processing units are located at different geographical locations. In the embodiment illustrated in FIG. 3, some call processing units 200, 210 are designed to provide telephony services to a user under a traditional service plan where the user pays a monthly fee for access to the system. Other call processing units 250, 260 are configured to provide telephony services to users who have purchased an instant mobile telephony service plan. Of course, some call processing units could be configured to provide telephony services to both types of users.

The call processing units 200, 210 specifically designed to provide telephony service to traditional plan users each includes a proxy server 202, 212. When a traditional plan user wishes to make a telephone call, a call set up request is sent from the user's telephony device to one of the call processing units 200, 210. For example, when a user dials a telephone number on mobile telephony device 102, the mobile telephony device 102 sends a call setup request to call processing unit 200 via the Internet 130. The call setup request is received by the proxy server 202. When the proxy server 202 receives a call setup request, the proxy server 202 communicates with the routing engine 202, via the Internet 130, to obtain call routing information.

The proxy server utilizes the routing information to implement the call to the dialed telephone number. This could include routing the call to the IP telephone 105 via the Internet 130. This could also include routing the call to the analog telephone 118, via the Internet 130 and the IP adaptor 119. In still other instances, this could include routing the call to analog telephone 106 or cellular telephone 104 via the PSTN/cellular network 120.

At the completion of the call, the proxy server 202, 212, or some other element within the call processing unit 200, 210 sends information about the call to the CDR generation unit 146 within the VOIP telephony system control center 141. The CDR generation unit 146 uses this information, and possibly information obtained from other sources, to create a call detail record which is stored in the CDR database 148. The dashed line between the proxy servers 202, 212, and the CDR generation unit 146 indicates this flow of information about calls which have been made by the users.

Although the above description explains what occurs when a user places a telephone call, similar actions would occur if a user requested some other type of telephony service. For example, a very similar process would occur if the user wished to send a text or SMS message to a telephony device associated with a particular telephone number.

The call processing units 250, 260 that provide telephony services to users under an instant mobile service plan include additional functionality. Specifically, before telephony services are provided to an instant mobile plan user, the call processing units 250, 260 determine whether the user has purchased an instant mobile plan that would entitle the user to receive the requested service. Also, for those instant mobile plans that provide only a predetermined number of calling minutes or a predetermined number of text messages, a determination is made regarding unused calling minutes or text messages remaining on the purchased plan.

The process of purchasing an instant mobile telephony services plan, and then using the plan to obtain telephony services will now be described in connection with FIGS. 4-7. The description will also refer to elements of the VOIP telephony system 140 illustrated in FIG. 3.

As noted above, the systems and methods described herein allow a user to purchase an instant mobile telephony services plan using a mobile telephony device. In particular, users would purchase an instant mobile plan using an application loaded onto a mobile telephony device such as, but not limited to, the aforementioned Apple products. Also, although a user's mobile telephony device is typically associated with and/or tied to a service provider network, the instant mobile telephony service plan is not necessarily tied to that service provider network. In fact, the service provider that delivers telephony services to a user under an instant mobile services plan could have no relationship with the telephony service provider which the user's mobile telephony device is associated.

A user would first download and install an application on his mobile telephony device. The application is provided by the VOIP telephony system. During the initial installation and configuration process, the user may provide a telephone number which is assigned to the user's mobile telephony device. When provided, that telephone number may be used when placing telephone calls for purposes of caller ID. Once the user has downloaded and installed the application, the application itself is used to facilitate the purchase an instant mobile telephony services calling plan. Steps of the method of purchasing an instant mobile telephony services calling plan are as illustrated in FIG. 4.

Figure 4:
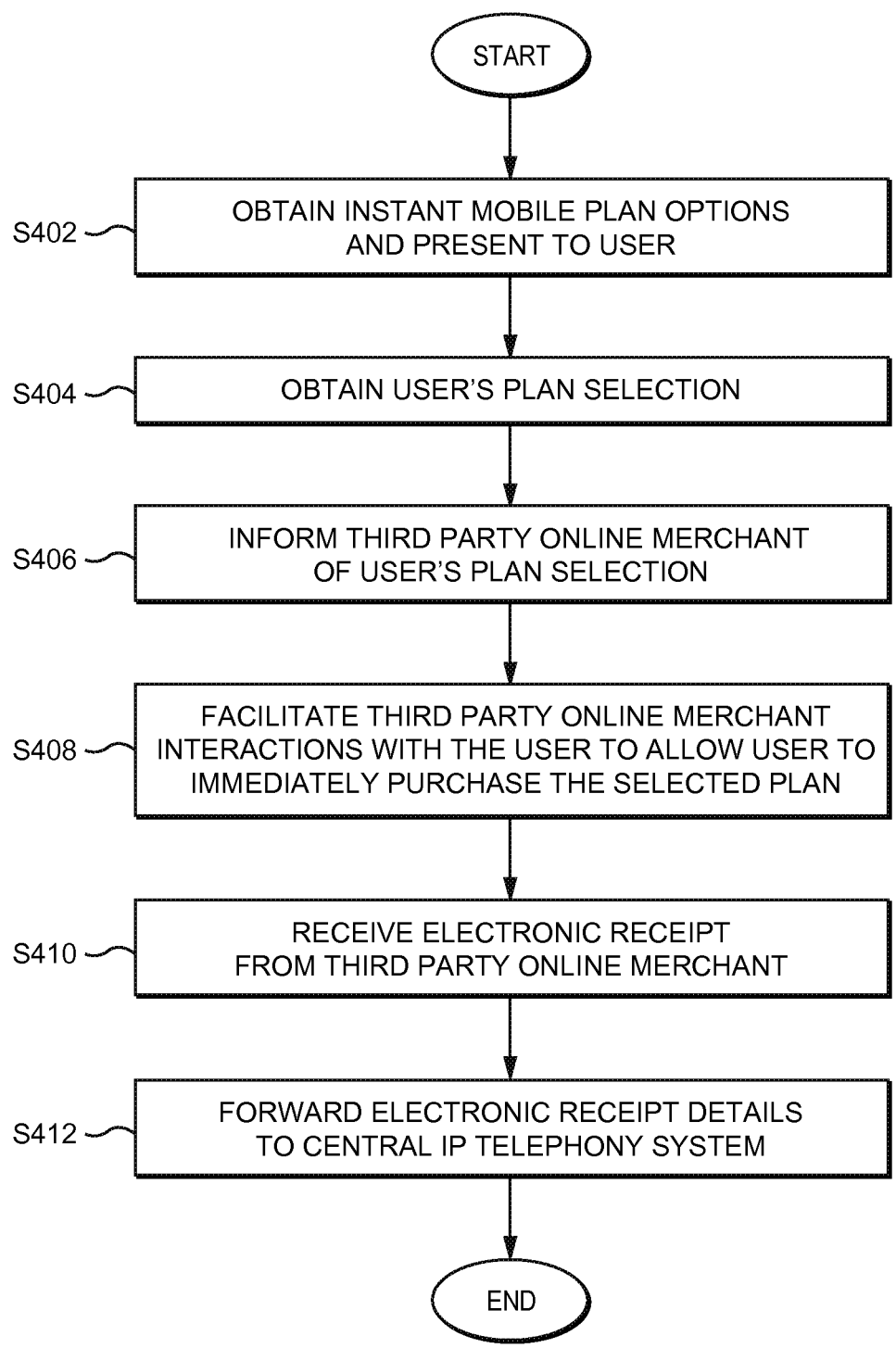
FIG. 4 is a diagram of steps of a method in which a user purchases an instant mobile telephony services plan.

As shown in FIG. 4, in step S402, the user utilizes the application installed on the user's mobile telephony device to obtain a list of mobile telephony service plans which can be purchased. As noted above, different plans enable the user to place telephone calls and/or send text messages to various different geographical locations.

Information describing the different available instant mobile plans, which are presented to the user by the application, could be stored in multiple different locations. In some instances, the application installed on the user's mobile telephony device may include information about available plan options. In other instances, the application on the user's mobile telephony device may obtain information on available plans from the VOIP telephony system control center 141. In still other instances, the application may obtain information on available plan options from a third party merchant that will process the purchase transaction.

The actual purchase of an instant mobile telephony services plan would be made via a third party online merchant 170. As illustrated in FIG. 3, the third party online merchant 170 is available via the Internet 130. In some embodiments, the VOIP telephony system control center 141 establishes a number of instant mobile telephony service plans, and those plans are stored by the third party online merchant 170 as items available for purchase. The application on the user's mobile telephony device 102 may communicate with the third party online merchant 170 via the Internet 130 to obtain information about the instant mobile plans that are available for purchase.

Turning back to the method illustrated in FIG. 4, once the user has been presented with a list of available instant mobile telephony service plans, in step S404, the user selects a plan. The application on the user's mobile telephony device 102 captures the user's plan selection in some suitable fashion. In step S406, the application on the user's mobile telephony device 102 informs the third party online merchant 170 of the selection made by the user.

The third party online merchant 170 then interacts directly with the user, via the user's mobile telephony device 102, to accomplish the purchase of the selected instant mobile plan. Information passing back and forth between the user and the third party online merchant 170 is not visible to the application on the user's mobile telephony device. Thus, any financial information or passwords which are used in order to execute the purchase is not made available to the application, or to the VOIP telephony service that created the application.

Many third party online merchants establish enduring relationships with individual users to make the purchase of items on their websites quick and easy. For example, an online merchant can allow a user to store credit card information which can be re-used to make multiple purchases over an extended period of time. In instances where the user stores credit card information with the online merchant, the online merchant is able to identify the user with a username and password.

One example of a third party online merchant which could be used to facilitate the purchase of an instant mobile telephony services plan is the Apple iTunes™ Store. The Apple iTunes™ Store allows a user to store credit card information, and that credit card information can be used to make multiple purchases over an extended period of time. The Apple iTunes™ Store is also designed to interact with various different mobile commuting devices such as the aforementioned Apple products.

Once a user's credit card information has been stored within the Apple iTunes™ store, it is no longer necessary for the user to enter credit card information for each individual purchase. In addition, the Apple iTunes™ store is able to identify users via the unique identification numbers assigned to the iPhone™, iTouch™ and iPad™ devices. Thus, when a user logs onto the Apple iTunes™ store using one of those devices, the iTunes™ store may be capable of identifying the user. To make a purchase, the user need only enter a password. Thus, purchases can be made on the previously recorded credit card by simply supplying a password.

In step S408 of the method illustrated in FIG. 4, the third party online merchant 170 interacts with a user via the user's mobile telephony device to allow the user to quickly and easily purchase the selected instant mobile telephony services calling plan. If the third party online merchant 170 has already identified the user by virtue of an identification number assigned to the user's mobile telephony device, the third party online merchant 170 may only need to ask the user to input his password to execute the purchase. In other instances, the user may be asked for a username and a password. If the user inputs the correct information, the third party online merchant 170 executes the purchase using the user's prerecorded credit card information. As noted above, the user's username and password information would be shielded from the application on the user's mobile telephony device.

Although references have been made to the Apple iTunes™ store, other online merchants could also be used to make the purchase of the instant mobile plan. Thus, the description of use of the Apple iTunes™ store should in no way be considered limiting.

The online merchant that facilitated the purchase of the instant mobile plan issues an electronic receipt for the purchase. This electronic receipt could be transmitted directly to the application on the user's mobile telephony device that is being used to make the purchase. Thus, the method illustrated in FIG. 4 includes step S410, in which the application receives the electronic receipt, or at least some details or information contained in the electronic receipt.

In step S412, the application on the user's mobile telephony device forwards details or information from the electronic receipt issued by the online merchant to the VOIP telephony system control center 141. As described in more detail below, this will allow the VOIP telephony service to confirm that the purchase was made.

Once a user has purchased an instant mobile telephony service plan through an online merchant 170, the VOIP telephony system control center 141 attempts to validate the purchase before providing the user with telephony services. This would typically be done through communications passing directly back and forth between the VOIP telephony system control center 141 and the third party online merchant 170. Steps of a verification method are illustrated in FIG. 5.

Figure 5:
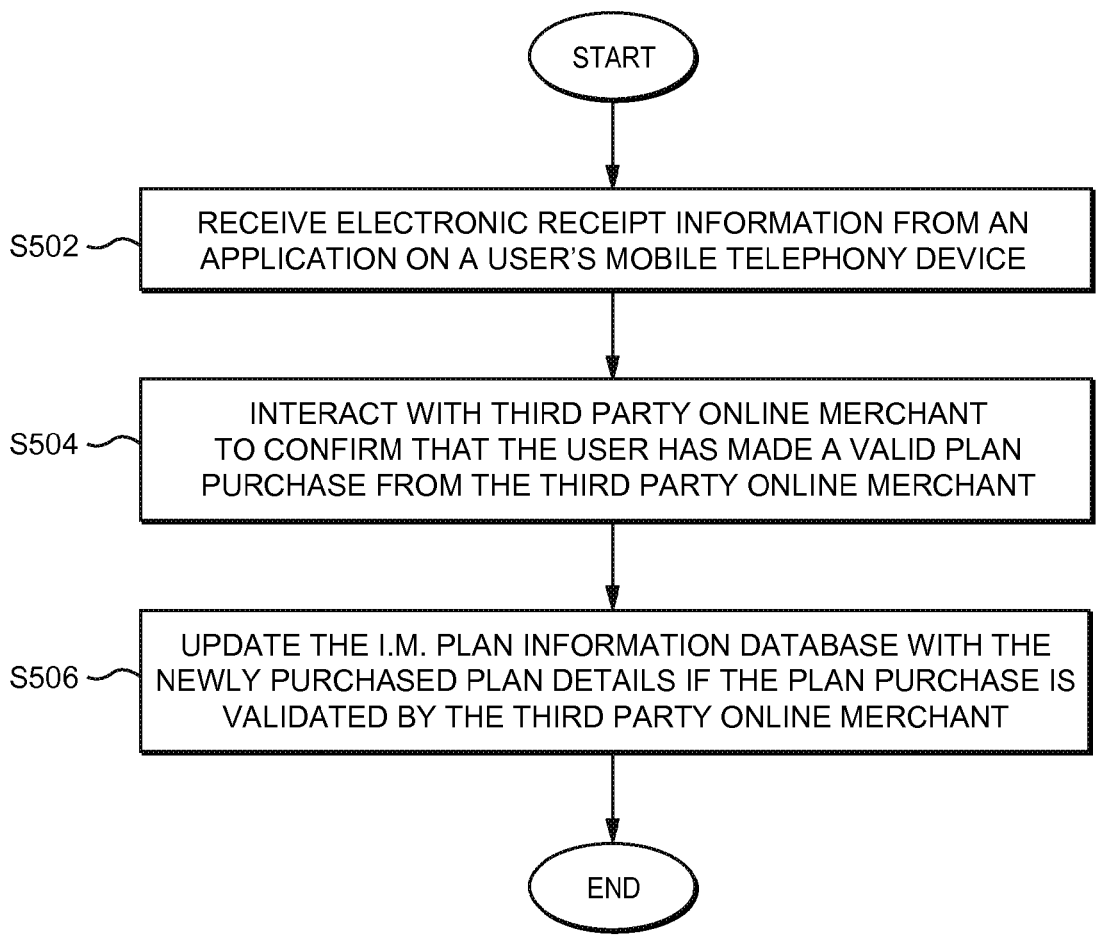
FIG. 5 is a diagram of steps of a method of verifying that a user has made a valid purchase of an instant mobile telephony services plan.

As shown in FIG. 5, in step S502, the VOIP telephony system control center 141 receives information from the electronic receipt generated by the third party online merchant 170. This information is forwarded to the VOIP telephony system control center 141 by the application on a user's mobile telephony device.

Next, using the information from the electronic receipt, the VOIP telephony system control center 141 interacts with the third party online merchant 170 to verify that the user has made a valid purchase of a particular instant mobile telephony services plan. If the third party online merchant 170 verifies that the purchase is valid, in step S506, the VOIP telephony system control center 141 updates a database of instant mobile telephony calling plans 149 which is also present within the VOIP telephony system control center 141.

As shown in FIG. 3, an instant mobile telephony services calling plan database 149 is stored at the VOIP telephony system control center 141. This database lists all valid instant mobile telephony service plans. As noted above, information about each calling plan is stored against a particular username established for the user who purchased the plan.

The information stored in the instant mobile telephony service plan database 149 could include beginning and ending dates for unlimited services calling plans. The database 149 could also include information about the number of unused minutes for calling plans where a user has purchased a specified number of calling minutes. The database 149 could also include information about the rate that was charged to the user, and the geographical location or locations to which the user is authorized to terminate the calls.

If a calling plan also permits a user to send text messages, information about the text messages could also be included in the database. For example, if the plan allows a user to send a predetermined number of text messages over a predetermined period of time, the database could indicate the number of text messages that have already been sent, and/or the number that the user can still send within the predetermined period of time. Of course, a variety of other types of information could also be stored within this database.

As explained above with reference to the system illustrated in FIG. 3, when a user wishes to place a telephone call, or send a text message, the user's mobile telephony device 102 sends a message to a call processing unit 250, 260 via the Internet 130. As illustrated in FIG. 3, the call processing units 250, 260 capable of completing calls under an instant mobile plan include mobile plan validation units 256, 266, and local copies of the mobile plan database 258, 268. These features are used to determine whether a request for telephony services should be fulfilled.

As noted above, the central VOIP telephony system control center 141 maintains a mobile plan database 149 which lists all active plans for its users. Copies of this mobile plan database 149 are periodically sent to each of the call processing units 250, 260 responsible for providing telephony services to instant mobile plan users.

A user wishing to place a telephone call using an instant mobile plan first runs or activates the application on the user's mobile telephony device 102 which was originally used to purchase the instant mobile plan. The user inputs the destination telephone number, and the application sends a message to one of the call processing units 250, 260 to request that a call be placed to the destination telephone number, or to request that a text message be sent to the destination telephone number.

Figure 6:
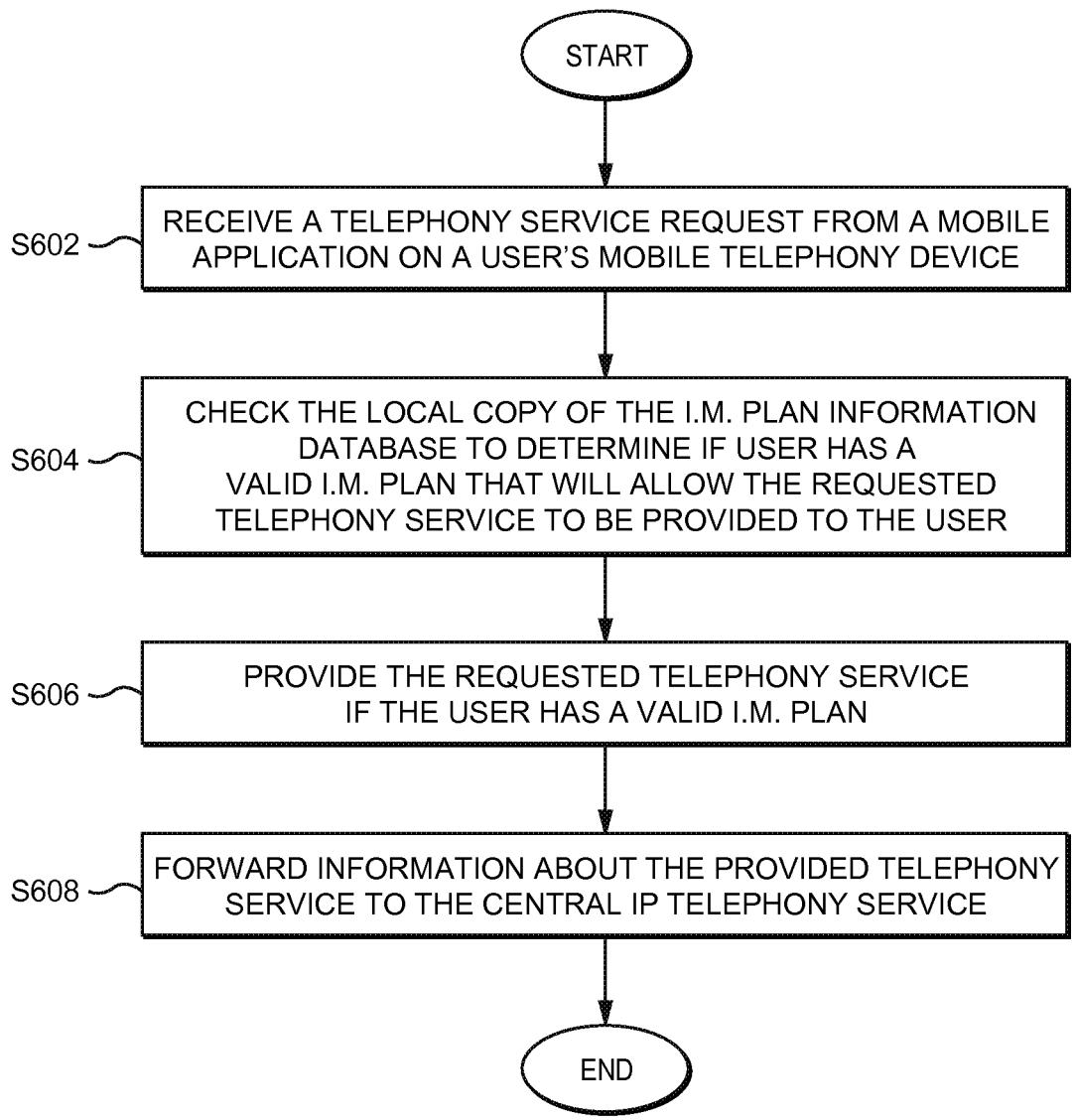
FIG. 6 is a diagram of steps of a method of providing telephony services to a user under an instant mobile telephony services plan.

FIG. 6 illustrates steps of a method in which telephony services are provided to a user under an instant mobile telephony services plan. The method begins with step S602, where one of the call processing units 250, 260 receives the request for telephony services from the application on the user's mobile telephony device 102. The method proceeds to step S604, where the mobile plan proxy server 252, 262 requests that a mobile plan validation unit 256, 266 determine if the user is authorized to receive the requested telephony service. The mobile plan validation unit 256, 266 checks the local copy of the instant mobile plan database 258, 268 to determine if this particular user has purchased an instant mobile plan which would allow the user to obtain the requested telephony services.

In some embodiments, the mobile plan validation unit 256, 266 would be separate from but co-located with the mobile plan proxy server 252, 262. In other embodiments, the functions performed by the mobile plan validation unit may be carried out by the same physical device acting as the mobile plan proxy server. In still other embodiments, the functions performed by the mobile plan validation unit may be performed by a device that is in a different physical location than the proxy server. For example, the mobile plan validation unit 256, 266, and the corresponding local copy of the mobile plan database 258, 268 may be at a central location, and communications between the mobile plan proxy server 252, 262 and the mobile plan validation unit 256, 266 may traverse the Internet or a private data network.

During step S604, the mobile plan validation unit 256, 266 checks the local copy of the mobile plan database 258, 268 to determine if the user has purchased an instant mobile plan which would allow the user to obtain the requested telephony services. If the user has purchased an instant mobile plan providing unlimited services to a particular location, this could involve checking to determine if the destination telephone number is within the geographical area covered by the plan. This check may also involve determining whether the purchased plan is still in effect, given the date of the request. In situations where the user has purchased a predetermined amount of telephony services, such as a predetermined number of calling minutes, or a predetermined number of text messages, the check may involve determining whether the user has already reached the limit of the plan.

If the check of the local copy of the mobile plan database indicates that the user is authorized to receive the requested telephony service, the mobile plan validation unit 256, 266 so informs the mobile plan proxy server 252, 262. In step S606, the proxy server fulfills the request. This could include connecting a call to the destination telephone number, sending a text message to the destination telephone number, or providing some other type of telephony service.

Finally, after the requested telephony service has been provided to the user, the mobile plan proxy server 252, 262 sends information about the telephony service that has been provided to the user to the VOIP telephony system control center 141. The dashed lines in FIG. 3 leading away from the mobile plan proxy servers 252, 262 and back to the VOIP telephony system control center 141 indicate the flow of information about telephony services which have been provided to a user under an instant mobile calling plan.

As explained above, in a traditional VOIP telephony service, information about a call that has been completed would be compiled into a call detail record by the CDR generation unit 146, and the CDR would be stored in a CDR database 148. This same basic process would continue to occur for calls made under an instant mobile calling plan. Thus, the dashed lines in FIG. 3 leading to the CDR generation unit 146 indicate that the information about completed telephone calls is still being used for purposes of generating call detail records.

In some embodiments, the CDR generation unit 146 which is used to create CDRs for traditional telephony service plan users would also be used to create CDRs for instant mobile plan users. A CDR would be generated and stored in the CDR database 148.

In alternate embodiments, a separate instant mobile plan update unit 147 could be used to create CDRs for telephone calls made under an instant mobile service plan. In those embodiments, the information provided by the mobile plan proxy servers 252, 262 would be used to generate the CDRs, and the instant mobile plan update unit 147 would store the CDRs in the same CDR database 148.

Some of the same basic information used to create a CDR for a call made under an instant mobile service plan is also used to update the mobile plan database 149. For example, if a user has purchased an instant mobile plan which provides for 100 minutes of calling time to a particular geographical area, each time that a user makes a telephone call under the plan, the utilized minutes must be deducted from the total number of minutes which the user originally purchased. This information is stored in the mobile plan database 149.

Once a call has been completed under such a plan, information about the call is sent to the instant mobile plan update unit 147. This information could be sent directly from the mobile plan proxy servers 252, 262 to the instant mobile plan update unit 147. Alternatively, some or all of the information sent from the mobile plan proxy servers 252, 262 to the CDR generation unit 146 could be forwarded on from the CDR generation unit 146 to the instant mobile plan update unit 147. In still other embodiments, information sent from the mobile plan proxy servers 252, 262 could first be sent to the instant mobile plan update unit 147, and some or all of that information could be forwarded from the instant mobile plan update unit 147 to the CDR generation unit 146.

Figure 7:
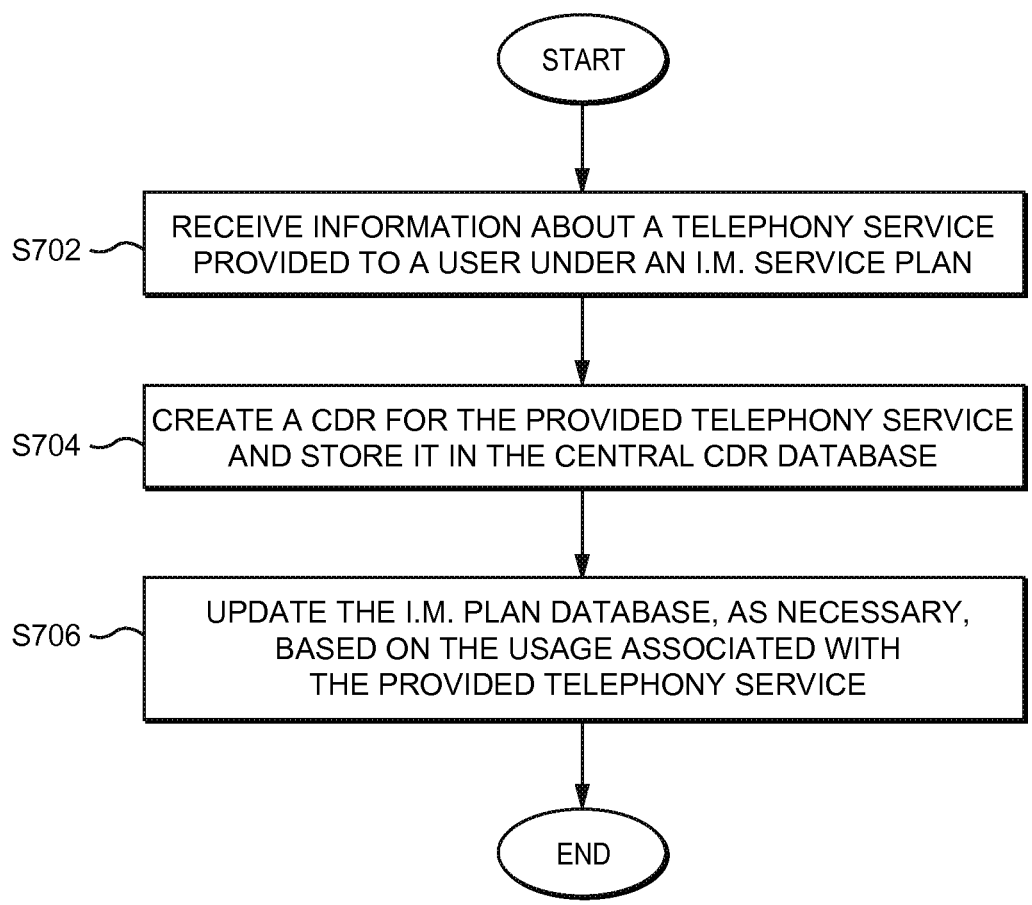
FIG. 7 is a diagram of steps of a method of updating various databases within a VOIP telephony system.

FIG. 7 illustrates steps of a method of updating instant mobile plan data after a telephony service has been provided under an instant mobile plan. The method begins in step S702, where some element of the VOIP telephony system control center 141 receives information about a telephony service that has been provided under an instant mobile plan. As explained above, this could include information sent from a mobile plan proxy server 252, 262 that actually provided the service to the user. This information could be received after the service has been provided. However, this information could also be received while the telephony service is being provided.

For example, a mobile plan proxy server could send multiple pieces of information about a call made by a user under an instant mobile plan. When a call is first setup for the user, the mobile plan proxy server that set the call up might send a first batch of information to the VOIP telephony system control center 141 indicating that the call has been established between the user and a destination telephony device. This could include the start time of the call. When the call is completed, the mobile plan proxy server might send a second batch of information to the VOIP telephony system control center 141. The second batch of information could include the end time of the call.

In other instances, the VOIP telephony system control center 141 could receive information about a telephony service provided to a user under an instant mobile service plan from multiple different sources. For example, the information could come from the mobile plan proxy server that set up the service, as well as other system assets that helped to deliver the telephony service to user.

As noted above, information about a telephony service provided to a user under an instant mobile service plan could be received by the CDR generation unit 146, by the instant mobile plan update unit 147, by both of these units, and/or by other portions of the VOIP telephony system control center 141.

In step S704, the received information would then be used to create a CDR for the telephony service provided under the instant mobile plan, and the CDR would be stored in the CDR database 148. As noted above, the CDR may be created by the CDR generation unit, or by the instant mobile plan update unit 147.

Finally, in step S706, the central mobile plan database 149 would be updated, as necessary, based on the usage that occurred when the telephony service was provided to the user. For example, if the instant mobile plan was one where the user purchased a predetermined number of calling minutes or a predetermined number of text messages, the actual usage would be deducted from the current balance, and the new balance would be stored in the mobile plan database.

As also noted above, the mobile plan database 149 would be periodically copied to each of the call processing units 250, 260 which provide telephony services to instant mobile plan users. To help prevent fraud, the updated mobile plan database 149 will be copied to each of the call processing units 250, 260 on a frequent basis. This ensures that a customer's usage of plan minutes or plan text messages will be current in the local copies of the mobile plan database 258, 268 each time that a mobile plan proxy server makes a check to determine if the user is authorized to receive a requested telephony service.

Moreover, to help prevent fraud, information about telephony services that have already been provided to users under an instant mobile service plan must be promptly forwarded to the VOIP telephony system control center 141, and the information must be promptly used to update the central mobile plan database 149.

As noted above, because a telephone number is not being assigned to a user when the user purchases an instant mobile calling plan, an instant mobile user would typically not be associated with any individual telephone number. Instead, the user would be associated with a username which has been selected by the VOIP telephony system or by the user.

In normal call detail records stored in the CDR database 148, the originating telephone number is noted. In some instances, a CDR could reflect a username, instead of the originating telephone number. This may require that the CDR database and/or the CDR generation unit 146 be modified to accommodate this change.

As also described above, when a user downloads and installs an application on the user's mobile telephony device which allows for the purchase and usage of instant mobile calling plans, the user may be provided with an opportunity to enter a telephone number associated with the mobile telephony device. This telephone number could appear as the originating telephone number of calls placed by the user for purposes of caller ID. However, even when a telephone number is used for caller ID purposes, the telephone number will not necessarily appear in call detail records.

As noted above, a particular instant mobile plan would likely cost a certain amount for unlimited calls to a particular geographical area, or for a predetermined number of minutes of calling time for calls directed to a particular geographical area. Because terminating calls to different geographical locations costs different amounts, the instant mobile plans would vary in price depending upon the geographical location where the calls are to be terminated.

In some instances, the system may be configured such that if the user purchases a high priced instant mobile plan, the user will still be allowed to place telephone calls to geographical locations which would normally have a lower cost. For example, if a user purchased an instant mobile plan which costs $100 for unlimited calls to a first geographical location, the user may be allowed to utilize that instant mobile plan for telephone calls to a second geographical location if the cost of a plan for calls to that second location would have cost less than $100. Alternatively, the user may be blocked from placing any telephone calls to geographical locations other than those identified in the original instant mobile calling plan.

In addition, instant mobile plans could differentiate between calls placed to normal landlines, and calls placed to mobile telephony devices. An instant mobile plan could permit only calls placed to landlines, or only calls placed to mobile devices. Alternatively, a single instant mobile service plan could permit calls to both landlines and mobile telephony devices.

An instant mobile plan would typically only allow the user to obtain telephony services via a data connection. A data connection between a user's mobile telephony device and the VOIP telephony system could be established through the data channel of a cellular network, or via a wireless or wired link to the Internet. However, if the user wishes to utilize an instant mobile plan to place a telephone call from a telephony device which cannot establishing a call via digital data, users may be provided with the option to call a central access number in order to place the telephone call.

Figure 2:
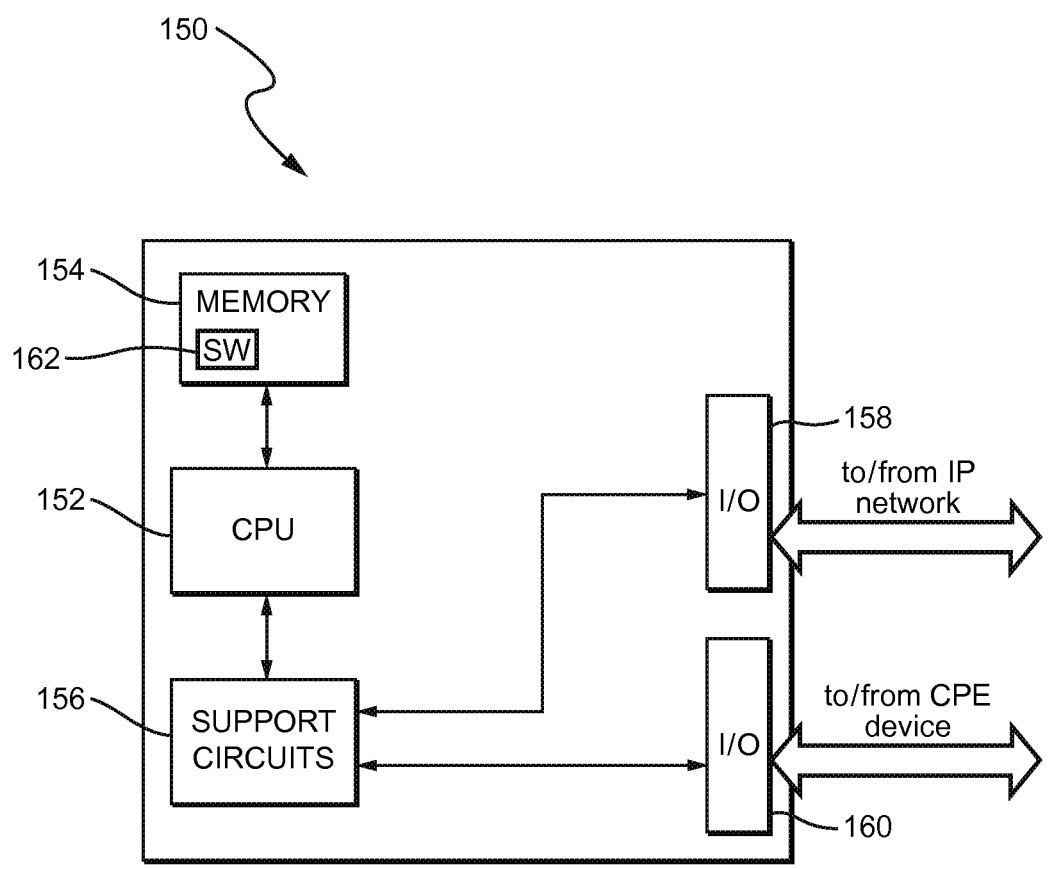
FIG. 2 is a diagram of various elements of a processor which can be part of a VOIP telephony system.

FIG. 2 illustrates elements of a computer processor that can be used as part of the VOIP telephony service 120 to accomplish various functions associated with the present invention. The VOIP telephony service 120 could include multiple processors 150 located at various locations in the system, along with their operating components and programming, each carrying out a specific or dedicated portion of the functions performed by the VOIP based telephony service 120.

The processor 150 shown in FIG. 2 may be one of any form of a general purpose computer processor used in accessing an IP-based network, such as a corporate intranet, the Internet or the like. The processor 150 comprises a central processing unit (CPU) 152, a memory 154, and support circuits 156 for the CPU 152. The processor 150 also includes provisions 158/160 for connecting the processor 150 to customer equipment and to service provider agent equipment, as well as possibly one or more input/output devices (not shown) for accessing the processor and/or performing ancillary or administrative functions related thereto. The provisions 158/160 are shown as separate bus structures in FIG. 2; however, they may alternately be a single bus structure without degrading or otherwise changing the intended operability of the processor 150.

The memory 154 is coupled to the CPU 152. The memory 154, or computer-readable medium, may be one or more of readily available memory such as random access memory (RAM), read only memory (ROM), floppy disk, hard disk, flash memory or any other form of digital storage, including but not limited to non-volatile memory, local or remote. The support circuits 156 are coupled to the CPU 152 for supporting the processor in a conventional manner. These circuits include cache, power supplies, clock circuits, input/output circuitry and subsystems, and the like.

A software routine 162, when executed by the CPU 152, causes the processor 150 to perform processes of the disclosed embodiments, and is generally stored in the memory 154. The software routine 162 may also be stored and/or executed by a second CPU (not shown) that is remotely located from the hardware being controlled by the CPU 152. Also, the software routines could also be stored remotely from the CPU. For example, the software could be resident on servers and memory devices that are located remotely from the CPU, but which are accessible to the CPU via a data network connection.

The software routine 162, when executed by the CPU 152, transforms the general purpose computer into a specific purpose computer that performs one or more functions of the VOIP telephony service 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 162 of the disclosed embodiments is capable of being executed on any computer operating system, and is capable of being performed using any CPU architecture.

While the technology has been described in connection with what is presently considered to be the most practical and preferred embodiments, it is to be understood that the technology is not to be limited to the disclosed embodiments, but on the contrary, is intended to cover various modifications and equivalent arrangements included within the spirit and scope of the appended claims.

The invention claimed is:

1. A method, which is performed by a first telephony service provider, of verifying and recording information about a communications services plan purchased by a user, the communications services plan covering communications services that will be provided by the first telephony service provider, comprising:
   receiving information about the purchased communications services plan, such communications services plan being purchased from a third party merchant;
   interacting with the third party merchant using the received information to verify that the user purchased the communications services plan from the third party merchant; and
   recording information about the purchased communications services plan in a communications services plan database, wherein the information is recorded against an identifier.

2. The method of claim 1, wherein the receiving step comprises receiving information was originally generated, at least in part, by the third party merchant when the user purchased the communications services plan from the third party merchant.

3. The method of claim 1, wherein the receiving step comprises receiving information from a mobile telephony device with which the user purchased the communications services plan from the third party merchant.

4. The method of claim 3, wherein the information received from the mobile telephony device was originally provided to the mobile telephony device by the third party merchant.

5. The method of claim 1, wherein the receiving step comprises receiving information from an application on a mobile telephony device with which the user purchased the communications services plan from the third party merchant.

6. The method of claim 1, wherein the receiving step comprises receiving information from a mobile telephony device with which the user purchased the communications services plan from the third party merchant, and wherein the mobile telephony device receives its native telephony service from a second telephony service provider that is different from the first telephony service provider.

7. The method of claim 1, wherein the recording step comprises recording information about the purchased communications services plan against an identifier associated with the user.

8. The method of claim 1, wherein the recording step comprises recording information about the purchased communications services plan against an identifier associated with the a mobile telephony device with which the user purchased the communications services plan from the third party merchant.

9. The method of claim 1, wherein the recording step comprises recording information about the purchased communications services plan against an identifier assigned by the first telephony service provider.

10. The method of claim 1, wherein the recording step comprises recording information about the purchased communications services plan against an identifier assigned by the third party merchant.

11. The method of claim 1, further comprising recording a telephone number in the communications services plan database against the same identifier, wherein the telephone number is associated with a mobile telephony device with which the user purchased the communications services plan from the third party merchant.

12. The method of claim 11, wherein the telephone number was originally assigned by a second telephony service provider that provides native telephony service to the mobile telephony device.

13. The method of claim 1, wherein the communications services plan is an instant mobile telephony services plan that provides the user with a pre-defined bundle of telephony services that are provided by the first telephony services provider.

14. The method of claim 13, wherein the recording step comprises recording information about the pre-defined bundle of services in the communications services plan database against the identifier.

15. The method of claim 1, further comprising sending a copy of the communications services plan database to a proxy server that handles user requests for communications services under purchased communications services plans.

16. A system that is utilized by a first telephony service provider for verifying and recording information about a communications services plan purchased by a user, the communications services plan covering communications services that will be provided by the first telephony service provider, comprising:
  means for receiving information about the purchased communications services plan, such communications services plan being purchased from a third party merchant;
  means for interacting with the third party merchant using the received information to verify that the user purchased the communications services plan from the third party merchant; and
  means for recording information about the purchased communications services plan in a communications services plan database, wherein the information is recorded against an identifier.

17. A system that is utilized by a first telephony service provider for verifying and recording information about a communications services plan purchased by a user, the communications services plan covering communications services that will be provided by the first telephony service provider, comprising:
  a purchase verification unit including at least one processor that receives information about the purchased communications services plan, such communications services plan being purchased from a third party merchant, the purchase verification unit also interacting with the third party merchant using the received information to verify that the user purchased the communications services plan from the third party merchant; and
  an update unit including at least one processor that records information about the purchased communications services plan in a communications services plan database, wherein the information is recorded against an identifier.

18. The system of claim 17, wherein the purchase verification unit receives information was originally generated, at least in part, by the third party merchant when the user purchased the communications services plan from the third party merchant.

19. The system of claim 17, wherein the purchase verification unit receives information from a mobile telephony device with which the user purchased the communications services plan from the third party merchant.

20. The system of claim 19, wherein the purchase verification unit receives information from the mobile telephony device was originally provided to the mobile telephony device by the third party merchant.

21. The system of claim 17, wherein the purchase verification unit receives information from an application on a mobile telephony device with which the user purchased the communications services plan from the third party merchant.

22. The system of claim 17, wherein the purchase verification unit receives information from a mobile telephony device with which the user purchased the communications services plan from the third party merchant, and wherein the mobile telephony device receives its native telephony service from a second telephony service provider that is different from the first telephony service provider.

23. The system of claim 17, wherein the update unit records information about the purchased communications services plan against an identifier associated with the user.

24. The system of claim 17, wherein the update unit records information about the purchased communications services plan against an identifier associated with the a mobile telephony device with which the user purchased the communications services plan from the third party merchant.

25. The system of claim 17, wherein the update unit records information about the purchased communications services plan against an identifier assigned by the first telephony service provider.

26. The system of claim 17, wherein the update unit records information about the purchased communications services plan against an identifier assigned by the third party merchant.

27. The system of claim 17, wherein the update unit records a telephone number in the communications services plan database against the same identifier, wherein the telephone number is associated with a mobile telephony device with which the user purchased the communications services plan from the third party merchant.

28. The system of claim 27, wherein the update unit records a telephone number that was originally assigned by a second telephony service provider that provides native telephony service to the mobile telephony device.

29. The system of claim 17, wherein the communications services plan is an instant mobile telephony services plan that provides the user with a pre-defined bundle of telephony services that are provided by the first telephony services provider.

30. The system of claim 29, wherein the update unit records information about the pre-defined bundle of services in the communications services plan database against the identifier.

31. The system of claim 17, wherein the update unit sends a copy of the communications services plan database to a proxy server that handles user requests for communications services under purchased communications services plans.

* * * * *